Feb. 28, 1950     C. SCHURMAN     2,499,168
DRAGSAW
Filed Aug. 26, 1946     2 Sheets-Sheet 1
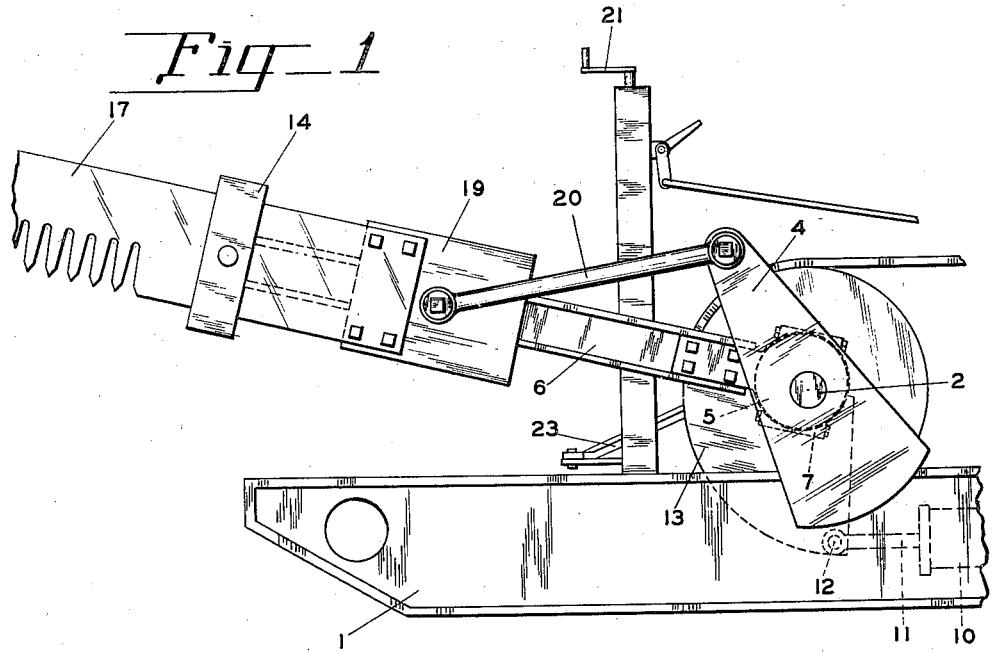
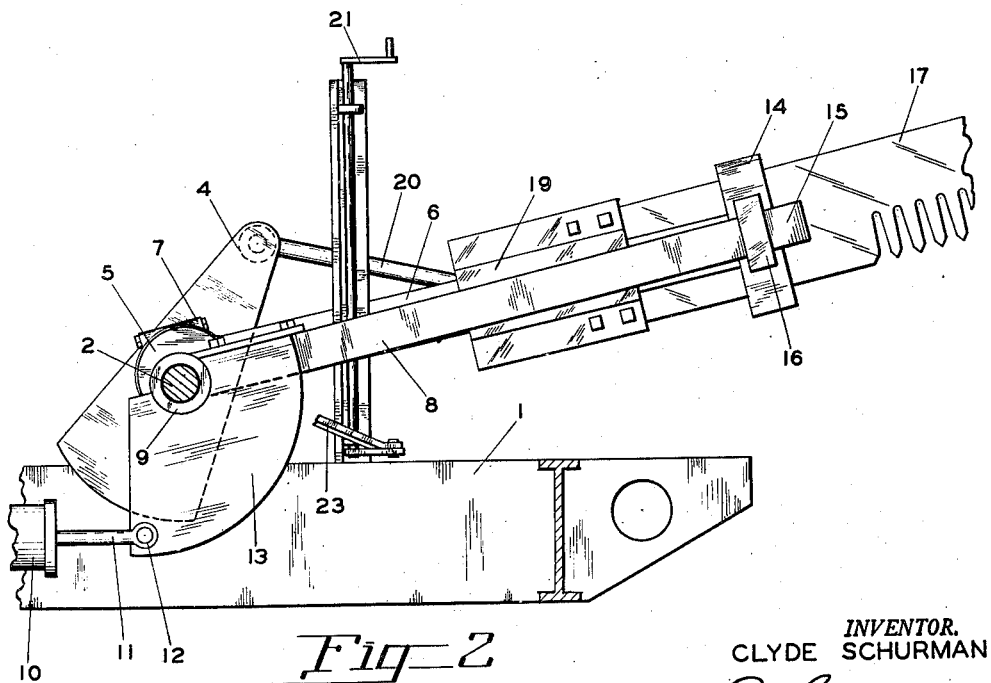
INVENTOR.
CLYDE SCHURMAN
ATTORNEY Feb. 28, 1950 C. SCHURMAN 2,499,168
DRAGSAW
Filed Aug. 26, 1946 2 Sheets-Sheet 2
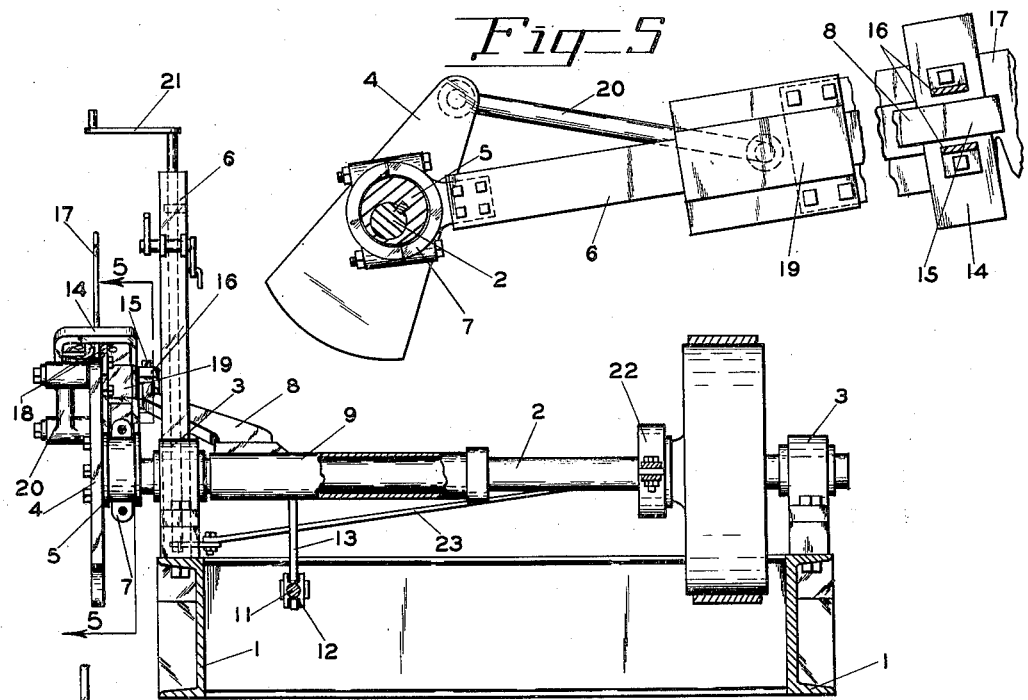
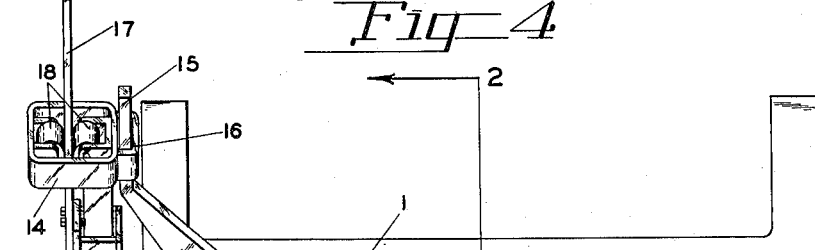
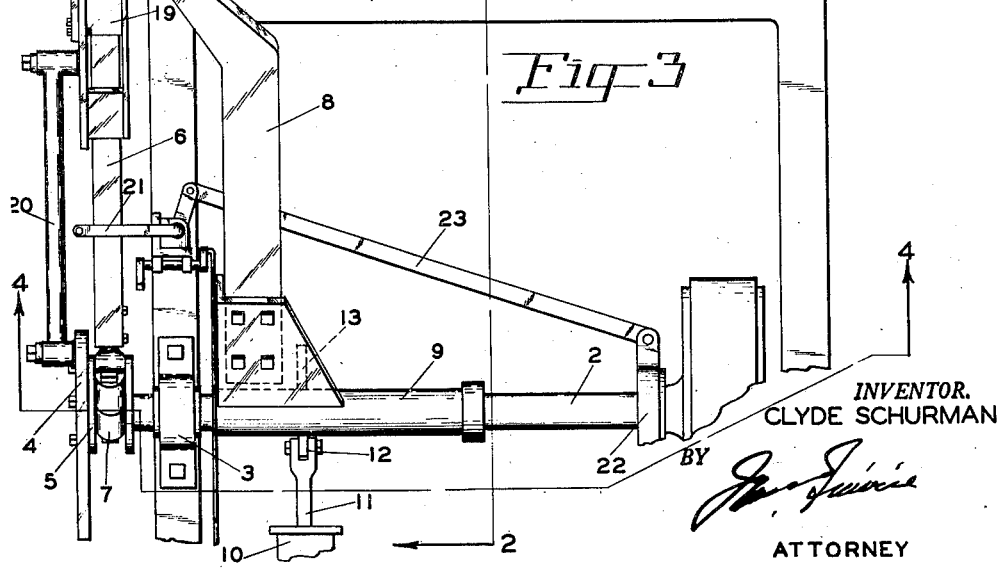
INVENTOR.
CLYDE SCHURMAN
BY
ATTORNEY Patented Feb. 28, 1950

2,499,168

UNITED STATES PATENT OFFICE 2,499,168

DRAGSAW

Clyde Schurman, Woodland, Wash.

Application August 26, 1946, Serial No. 693,038

2 Claims. (Cl. 143—63)

This invention relates to drag saws and is particularly adapted to power drag saws.

The primary object of the invention is the provision of a drag saw mounting, having a brace for maintaining the saw in alignment that is pivotally mounted to the pivot point of the general overall saw assembly.

My new and improved drag saw assembly is particularly adapted to my co-application on improvements in yarding and cut off saw combinations, parts of which I have illustrated in the accompanying drawings in order to carry out the spirit of this particular improvement in drag saws.

These and other incidental objects will be apparent in the drawings, specifications and claims.

Referring to the drawings:

Figure 1 is a fragmentary side view of my new and improved drag saw.

Figure 2 is a fragmentary sectional view of my drag saw taken from the opposite side.

Figure 3 is a fragmentary plan view of the drag saw assembly.

Figure 4 is an end sectional view taken on line 4—4 of Figure 3.

Figure 5 is an enlarged detailed fragmentary view of the saw guide, cross head and driving crank, parts broken away for convenience of illustration.

In the drawings:

My new and improved drag saw may be mounted to a frame 1, having a countershaft 2 journalled in bearings 3 and mounted thereon. The countershaft 2 has a crank arm 4 fixedly secured to one of its ends. An eccentric assembly 5 is also mounted to the end of the shaft 2 and adjacent the crank 4. A cross head guide bar is indicated at 6 having one of its ends connected to the eccentric by the eccentric ring 7. The opposite end of the cross head guide bar is supported and braced by the brace 8 in the following manner.

The brace 8 is fixedly secured to the tube bearing 9 through which revolves the countershaft 2. The tube bearing 9 is controlled from the hydraulic cylinder 10 through the piston rod 11, which is pivotally mounted at 12 to the crank 13. The crank 13 is fixedly secured to the tube 9 and the brace 8 by any suitable means, as welding or bolting.

Secured to the outer end of the cross head guide 6 is a saw guide head 14. This head is securely fastened by any suitable means to the cross head guide bar. The end 15 of the brace 8 is slidably mounted within a guide bar 16 forming part of the head 14 and allows for an oscillating movement imparted to the cross head guide bar 6 by the eccentric assembly 5. This oscillating movement is of well known practice in drag saw operations.

My new and improved drag saw consists of supporting the outer end of the cross head guide bar 6 by the brace 8 so that the guide 6 is maintained in a predetermined alignment relative to the frame of the drag saw assembly. This brace also acts as an arm for raising and lowering the guide bar 6 through the action of the hydraulic cylinder 10 as above described. I do not attempt to illustrate how the hydraulic cylinder 10 is operated, as the saw assembly may be raised and lowered by suitable means for operating the same.

The saw guide head 14 for guiding the saw 17 consists of guide rollers 18. The saw is mounted to the cross head 19 in the usual manner and the cross head is operated by the connecting rod 20 through the crank 4, and the countershaft 2 may be driven by any suitable drive. A control lever 21 is provided for operating a clutch assembly 22 through the connecting line 23.

Again I do not wish to be limited to the exact mechanical structure as other mechanical equivalents may be substituted in the structure of the saw assembly and drive. My invention, as stated above, primarily consists of the bracing arm 8 rigidly connected to the bearing tube 9 so that the saw assembly in general will be guided through the log to be cut with a minimum of side sway or whipping of the saw.

What I claim as new is:

1. A drag saw mechanism, comprising a drive shaft, an eccentric on the shaft, a bar connected to and extending from the eccentric, a cross head slidably mounted on the bar, a saw blade secured to the cross head, a crank on the shaft, a rod connecting the crank and the cross head, to reciprocate the cross head, a guide mounted on the cross head, a sleeve on the shaft, an arm secured at one end to the sleeve and having its opposite end slidably extending through the guide on the cross head, and means for rocking the sleeve for raising and lowering the saw blade through movement of the arm in the guide.

2. A drag saw mechanism as defined in claim 1, wherein the sleeve rocking means comprises a lever extending from said sleeve, and hydraulic means connected to the lever for actuating the arm.

CLYDE SCHURMAN.

(References on following page)

REFERENCES CITED

The following references are of record in the file of this patent:

UNITED STATES PATENTS

| Number | Name | Date |
|---|---|---|
| 349,819 | Smith | Sept. 28, 1886 |
| 606,051 | Cunningham | June 21, 1898 |
| 825,315 | Hamachek | July 10, 1906 |
| 1,309,781 | School | July 15, 1919 |
| 1,367,480 | Jacy | Feb. 1, 1921 |
| 1,445,039 | Pribnow | Feb. 13, 1923 |
| 1,489,387 | Fosberg | Apr. 8, 1924 |
| 1,824,555 | Lathers | Sept. 22, 1931 |

FOREIGN PATENTS

| Number | Country | Date |
|---|---|---|
| 106,557 | Great Britain | May 31, 1917 |